June 23, 1970 J. T. KRAUSE 3,517,345
COMPOSITE DELAY LINE STRUCTURE
Filed Dec. 14, 1966
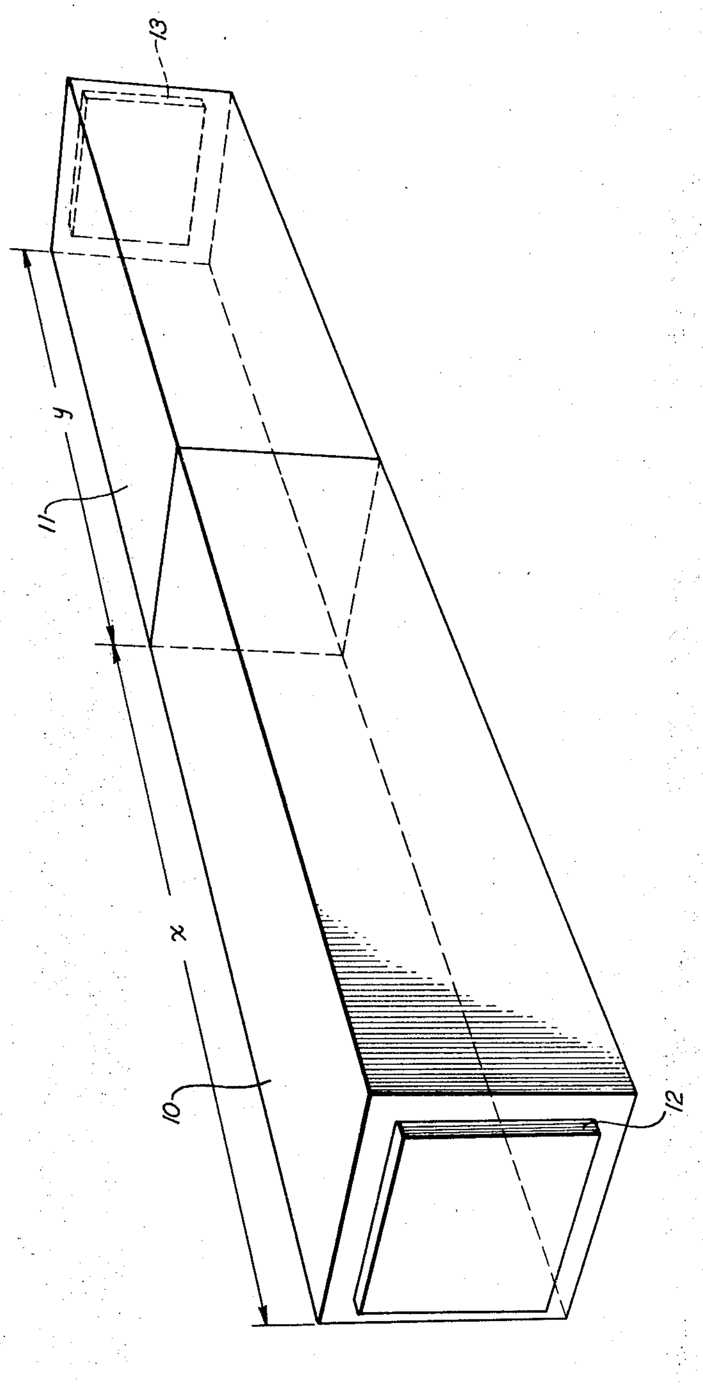
INVENTOR
J. T. KRAUSE
BY [signature]
ATTORNEY United States Patent Office 3,517,345

Patented June 23, 1970

3,517,345
COMPOSITE DELAY LINE STRUCTURE

John T. Krause, New Providence, N.J., assignor to Bell Telephone Laboratories, Incorporated, Murray Hill and Berkeley Heights, N.J., a corporation of New York Filed Dec. 14, 1966, Ser. No. 601,716
Int. Cl. H03h 7/30
U.S. Cl. 333—30 5 Claims

ABSTRACT OF THE DISCLOSURE

The specification describes a composite delay line in which two different acoustic materials are joined to form a single delay element. This enables the use of acoustic materials that have high Q values but which have an undesirably high temperature dependence of delay time. If the materials chosen have temperature coefficients of delay that are opposite in sign, the length of the delay elements can be tailored to give a zero temperature coefficient for the composite structure.

This invention relates to ultrasonic delay lines having minimum temperature coefficients.

Delay lines which are essentially insensitive to temperature changes over a reasonably broad temperature range are required for many electrical circuit applications. Several glass compositions which inherently have low temperature sensitivity of delay time with temperature are available such as those described in U.S. Pat. No. 3,154,425 issued Oct. 27, 1964 to H. L. Hoover and M. E. Nordberg. However such glasses become excessively lossy at frequencies in excess of 100 mc. Fused silica is an especially efficient ultrasonic delay medium at high frequencies (100 mc. to 300 mc.) but unfortunately its delay time is quite sensitive to temperature variations. There are other ultrasonic delay media available which efficiently propagate ultrasonic waves at high frequencies but which also have substantial delay time versus temperature sensitivity.

According to this invention two such media having low acoustic loss but relatively high temperature sensitivity can be combined in a composite delay line structure to product a high frequency delay line having very low temperature sensitivity. This is done by combining a material having a positive coefficient of delay time versus temperature change with a material having a negative coefficient and adjusting the relative lengths of travel of the ultrasonic wave according to the relative magnitude of the coefficients to give an essentially zero temperature coefficient.

These and other aspects of the invention may be appreciated from the following detailed description. In the drawing:

The figure is a perspective view of a composite delay line constructed according to the principles of this invention.

In the figure the delay medium of the delay line shown consists of two sections 10 and 11 having lengths "$x$" and "$y$" as shown. Electromechanical transducers 12 and 13 are provided in the customary manner. The sections 10 and 11 are composed of materials having opposite delay time versus temperature coefficients. The relative lengths $x$ and $y$ are computed from the relationship:

$$adx=bd'y$$

where $a$ and $b$ are the absolute values of the coefficients of delay time versus temperature and have opposite signs and $d$ and $d'$ are the unit delay times for the materials having their lengths defined as $x$ and $y$ respectively. The total desired delay time is given by $dx+d'y$.

The following specific embodiment is given by way of example.

As previously indicated, fused silica is an efficient ultrasonic medium for frequencies up to 300 mc., except that it has a coefficient of delay time versus temperature for a shear mode of −76 p.p.m./° C. Other materials having desirable loss characteristics for high frequencies are calcium aluminate glasses having the following compositions. (Percentages are in mol percent.) IR–11: BaO—2.7%, CaO—44.3%, $Al_2O_3$—39.4%, MgO—2.7%, $TiO_2$—1.4%, $ZrO_2$—1.4%, $Na_2O$—5.1%, $K_2O$—1.7%, $FeO_2O_3$—1.4%, $Cu_2O$—0.17%, $SiO_2$—None, ZnO—None. IR–12: BaO—2.6%, CaO—42.8%, $Al_2O_3$—37.9%, MgO—2.6%, $TiO_2$—None, $ZrO_2$—None, $Na_2O$—4.9%, $K_2O$—1.6%, $Fe_2O_3$—1.3%, $Cu_2O$—0.16%, $SiO_2$—3.3%, ZnO—2.6%.

These glasses have coefficients of delay time versus temperature of +42 p.p.m./° C. The unit delay times of these glasses and of fused silica are approximately equal. Therefore the relative lengths $x$ and $y$ are given by:

$$\frac{x}{y}=\frac{76}{42}$$

A ten microsecond zero temperature coefficient delay line operating at 300 mc. was constructed with fused silica and the IR–11 glass. Referring to the figure, the body 10 consisted of a length of fused silica 0.55 inch in length and the body 11 consisted of the aforementioned calcium aluminate glass 1.0 inch in length. The pieces were cemented together with a thin bond of epoxy adhesive. The loss of the line is approximately 25 db at 300 mc.

There are other available materials suitable for the composite structure of this invention. For instance a very suitable delay medium in polycrystalline magnesium fluoride which has a coefficient of delay time versus temperature of +61 p.p.m. and a unit delay time which approximately matches that of fused silica. It also has acceptable loss characteristics in the 300 mc./s. range. A composite delay line incorporating this material would have a dimensional ratio of fused silica to magnesium fluoride of 61/76.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A composite ultrasonic delay line having a small variation of delay time with temperature comprising a composite delay medium having at least two electromechanical transducers attached thereto said composite delay medium consisting essentially of two discrete bodies having low acoustic loss associated together, a first body having a positive coefficient of delay time versus temperature and a second body consisting essentially of fused silica having a negative coefficient of delay time versus temperature the relative lengths of the two bodies along the path traveled by the ultrasonic wave through the composite medium being defined by the relationship:

$$adx=bd'y$$

where $ad$ and $x$ are properties of said first body, $bd'$ and $y$ are properties of said second body, $a$ and $b$ are the absolute values of the coefficients of delay time versus temperature, $d$ and $d'$ are the unit delay times and $x$ and $y$ are the relative lengths thus resulting in an essentially zero temperature coefficient for the composite structure.

2. A composite ultrasonic delay line comprising a composite delay medium and at least two electromechanical transducers attached to said medium, the composite delay medium consisting essentially of a body of fused silica bonded to a body of a calcium aluminate glass having one of the following approximate compositions: BaO—2.7%, CaO—44.3%, $Al_2O_3$—39.4%, $M_gO$—2.7%, $TiO_2$—1.4%, $ZrO_2$—1.4%, $Na_2O$—5.1%, $K_2O$—1.7%, $Fe_2O_3$—1.4%, $Cu_2O$—0.17%, $SiO_2$—None, ZnO—None; and BaO—2.6%, CaO—42.8%, $Al_2O_3$—37.9%, MgO—2.6%, $TiO_2$—None, $ZrO_2$—None, $Na_2O$—4.9%, $K_2O$—1.6%, $Fe_2O_3$—1.3%, $Cu_2O$—0.16%, $SiO_2$—3.3%, ZnO—2.6%, the relative lengths of the fused silica body and the calcium aluminate glass body along the direction of propagation of an ultrasonic wave through said composite delay medium having a ratio of approximately 42/76.

3. A composite ultrasonic delay line having a small variation of delay time with temperature comprising a composite delay medium and at least two electrochemical transducers attached to said medium the composite delay line consisting essentially of a body of fused silica bonded to a body of polycrystalline magnesium fluoride the relative lengths of these bodies along the direction of propagation of an ultrasonic wave through said composite delay medium having a ratio of approximately 61/76.

4. The device of claim 1 wherein the first and second bodies are bonded together with a thin bond of adhesive.

5. The device of claim 1 wherein the first and second bodies each have an electromechanical transducer attached thereto on both ends and such bodies are electrically coupled together by means of a wire connecting a transducer of the first body to a transducer of the second body.

References Cited

UNITED STATES PATENTS

| | | | |
|---|---|---|---|
| 3,383,631 | 5/1968 | Korpel | 333—30 |
| 3,378,792 | 4/1968 | Holton | 333—30 |
| 3,277,404 | 10/1966 | Fabian | 333—30 |
| 3,400,340 | 9/1968 | Papadakis | 333—30 |

HERMAN K. SAALBACH, Primary Examiner

C. BARAFF, Assistant Examiner

U.S. Cl. X.R.

310—8

PO-1050
(5/69)

UNITED STATES PATENT OFFICE
CERTIFICATE OF CORRECTION

Patent No. 3,517,345 Dated June 23, 1970

Inventor(s) John T. Krause

It is certified that error appears in the above-identified patent and that said Letters Patent are hereby corrected as shown below:

Please cancel Claim 5.

In the heading to the printed specification, line 8, "5 Claims" should read -- 4 Claims --.

SIGNED AND
SEALED
SEP 15 1970

(SEAL)
Attest:

Edward M. Fletcher, Jr.
Attesting Officer

WILLIAM E. SCHUYLER, JR.
Commissioner of Patents